Patented July 19, 1932

1,867,633

UNITED STATES PATENT OFFICE

ROBERT G. SEAMAN, OF DOVER, NEW JERSEY, ASSIGNOR TO THE NAUGATUCK CHEMICAL COMPANY, OF NAUGATUCK, CONNECTICUT, A CORPORATION OF CONNECTICUT

RUBBER DISPERSING AGENT

No Drawing. Application filed August 27, 1930. Serial No. 478,283.

This invention relates to improvements in the art of producing artificially prepared dispersions of rubber or rubber-like materials.

In order to prepare a dispersion of rubber in a non-solvent thereof such as water, the rubber is usually softened as by milling and then placed in a heated mixer of the Werner and Pfleiderer type together with suitable dispersing agents and colloids and the mass mixed with the addition of water until the rubber changes from the continuous phase to the disperse phase, whereupon such additions are made of materials as is found suitable to confer additional stability or proper consistency to the final product. The dispersing agents and protective bodies are generally of hydrophilic nature such as soaps, caseins, clays etc. One method of dispersing rubber is disclosed by Pratt U. S. Patent No. 1,609,308, although there are other methods in use.

An object of this invention is to provide an improved type of dispersing agent for forming aqueous dispersions of rubber or rubber-like materials, which agent at the present time is a waste product in the silk industry.

The invention accordingly comprises dispersing rubber in a non-solvent thereof such as water with the aid of boil-off liquor of the silk industry. Boil-off liquor from the silk industry contains a large proportion of wax-like bodies such as sericin and also generally alkali soaps of the nature of palm or olive oil or oleic acid soaps. In using this material an alkali is added in conjunction therewith to saponify and solubilize the boil-off liquor and aid in the dispersion of the rubber.

The boil-off liquor is preferably added to the rubber in the mixer together with an alkali such as sodium hydroxide. The proportions of alkali may range from 1 to 100 parts to 100 parts of dry solids of the boil-off liquor. The mixer is heated meanwhile agitating the mix and sufficient water added either continuously or intermittently until the rubber becomes dispersed in the aqueous medium. Any variation may be made in the technique of adding the new dispersing agent, which is consistent with good practice in the present art of artificially dispersing rubber with dispersing agents. For instance the required alkali may be added to the boil-off liquor before, during, or after the addition to the rubber mass, and, if desired, other protective bodies and also compounding ingredients may be incorporated with the dispersion. The boil-off liquor may also be concentrated to any desired solid content before using.

*Example 1.*—To a typical sample of silk boil-off liquor obtained from the degumming tanks of a silk factory and containing 1.6% total solids is added 1.6% of solid sodium hydroxide and the mixture concentrated to a total solid content of 40%. 160 grams of this material are added to 800 grams of well masticated whole tire reclaim in a Werner Pfleiderer mixer and thoroughly incorporated therein. Subsequent addition of water to this mixture produces a fine particle size, stable dispersion in which the rubber is the disperse phase.

The expression "silk boil-off liquor" in the claims is to include any type of the liquid product which remains after degumming silk as practiced in the silk industry, and may include besides sericin and/or its decomposition products, amounts of alkali soaps or other degumming agents, silk oils and/or waxes, sizing materials and miscellaneous ash impurities.

Having thus described my invention, what I claim and desire to protect by Letters Patent is:

1. A method of forming artificial dispersions of rubber which comprises dispersing rubber in a non-solvent thereof with the aid of silk boil-off liquor as a dispersing agent for the rubber.

2. A method of forming artificial dispersions of rubber which comprises dispersing rubber in a non-solvent thereof with the aid of silk boil-off liquor comprising sericin and alkali soaps as a dispersing agent for the rubber.

3. A method of forming artificial dispersions of rubber which comprises dispersing rubber in a non-solvent thereof with the aid of an alkali treated silk boil-off liquor.

4. A dispersion of rubber prepared by dispersing rubber in a non-solvent thereof according to the process of claim 1.

5. A dispersion of rubber prepared by dispersing rubber in a non-solvent thereof according to the process of claim 2.

6. An aqueous dispersion of rubber containing alkali-treated silk boil-off liquor.

Signed at Passaic, county of Passaic, State of New Jersey, this 22nd day of August, 1930.

ROBERT G. SEAMAN.